United States Patent [19]

Wilson

[11] Patent Number: 4,716,870
[45] Date of Patent: Jan. 5, 1988

[54] ROTARY INTERNAL COMBUSTION ENGINE

[76] Inventor: Clifford E. Wilson, 128 College St., Madisonville, Tenn. 37354

[21] Appl. No.: 878,350

[22] Filed: Jun. 25, 1986

[51] Int. Cl.$^4$ ............................................. F02B 53/00
[52] U.S. Cl. ..................................... 123/245; 418/36; 74/393; 74/437
[58] Field of Search ................. 123/213, 245; 418/35, 418/36, 37, 38; 74/393, 437

[56] References Cited

U.S. PATENT DOCUMENTS

| | | | |
|---|---|---|---|
| 1,676,211 | 7/1928 | Bullington | 418/36 |
| 3,034,449 | 5/1962 | Moore | 418/36 |
| 3,500,798 | 3/1970 | Arnal | 418/36 |
| 3,696,797 | 10/1972 | Kessler | 123/245 X |
| 3,890,939 | 6/1975 | McIntosh | 418/36 |
| 3,908,608 | 9/1975 | Fox | 123/213 |

Primary Examiner—Michael Koczo
Attorney, Agent, or Firm—Pitts and Brittian

[57] ABSTRACT

An internal combustion engine (10) is provided which includes a wall (12) defining a toroidal cylinder (22). A pair of flywheels (36 and 38) are mounted for rotating with respect to said cylinder (22) on a central axis thereof and with respect to each other. Each of the flywheels carry at least a pair of pistons (50) mounted at selected locations, and preferably 180 degrees apart. These pistons (50) cooperate to define compressing/expanding chambers during rotation of the flywheel. Air and fuel are selectively drawn or injected into the cylinder chambers, ignited and then exhausted from the chambers during engine operation. A device (70) is also provided to control the speed of revolution of the pistons during the engine cycling such that the compression/expansion chambers are defined at selected locations during a cycle of the engine.

17 Claims, 6 Drawing Figures

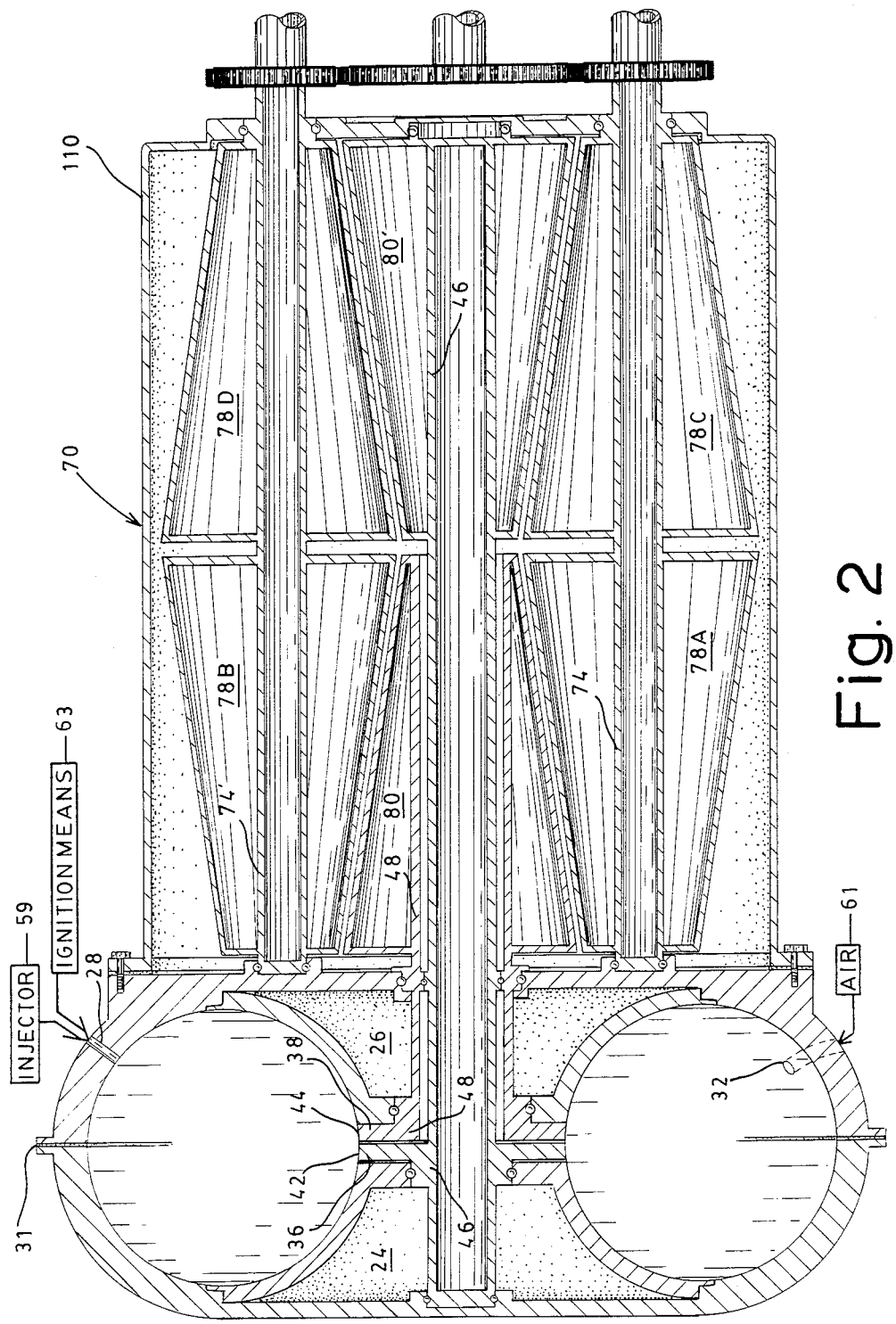

ROTARY INTERNAL COMBUSTION ENGINE

DESCRIPTION

1. Technical Field

This invention relates generally to internal combustion engines, and more particularly to such an engine having a toroidal cylinder with revolving pistons mounted therein. The pistons rotate at varying angular velocities to selectively define compressing/expanding chambers during the engine operation.

2. Background Art

Heretofor, various internal combustion engines have been known which employ toroidal shaped cylinders. Known prior art devices are described in the following U.S. Pat. Nos. 1,353,099, issued to N. B. Wales, on Sep. 14, 1920; 2,651,206, issued to H. J. La Veille on Sep. 8, 1953; 3,080,856, issued to H. J. Berry on Mar. 12, 1963; 3,516,392, issued to P. E. Morgan on June 23, 1970; 3,580,228, issued to O. Rocha on May 25, 1971; and 3,602,203, issued to R. C. Mowry on Aug. 31, 1971.

It will be noted upon viewing certain of these various prior art devices, complex mechanisms are used both in the structure of the cylinders and in the devices for controlling the revolution of the pistons. It will further be noted that certain of the prior art devices incorporate pistons which revolve within the cylinder in opposite directions which requires a complete termination of the motion of the piston prior to a reversal of its direction of travel. It is commonly known that such direction reversal results in a loss of efficiency and a reduction in fuel economy.

Accordingly, it is an object of the present invention to provide an improved internal combustion engine having a toroidal cylinder within which the pistons revolve in a unitary direction but at varying speeds during the engine cycle.

Another object of the present invention is to provide such an engine which can be readily manufactured and relatively easily maintained.

Another object of the present invention is to provide such an engine with enhanced fuel efficiency characteristics resulting in part from elimination of the necessity for the pistons to revolve in opposite and/or reversing directions, and the inherent lighter weight of the engine itself.

DISCLOSURE OF THE INVENTION

Other objects and advantages will be obvious, and will in part appear in part hereinafter, and will be accomplished by the present invention which provides an improved internal combustion engine having a toroidal cylinder. At least one pair of flywheels is mounted for revolution with respect to said cylinder on a central axis thereof, and with respect to each other. Pistons are carried by each of the flywheels. More specifically, a pair of pistons is mounted on each of the flywheels at selected locations. These pistons revolve in the same direction, but at varying speeds, i.e., at different angular velocities, and thereby cooperate to define with the cylinder, compressing/expanding chambers during the engine cycle. Means are provided for injecting fuel and air into the compressing chamber through the wall of the cylinder. This fuel and air mixture is ignited for producing the power stroke of the engine. Further, a device is provided for controlling the mode of operation of the pistons and the flywheels such that they revolve in the same direction within the cylinder at varying speeds of revolution during the engine cycle to sequentially define compressing and expanding chambers in which fuel and air are mixed and ignited, and then exhausted.

BRIEF DESCRIPTION OF THE DRAWINGS

The above-mentioned features of the present invention will be more clearly understood from consideration of the following description in connection with the accompanying drawings in which:

FIG. 2 is a sectional side elevation view of an engine constructed in accordance with various features of the present invention. This figure further depicts a device for controlling the mode of operation of the pistons.

BEST MODE FOR CARRYING OUT THE INVENTION

Figure 1:
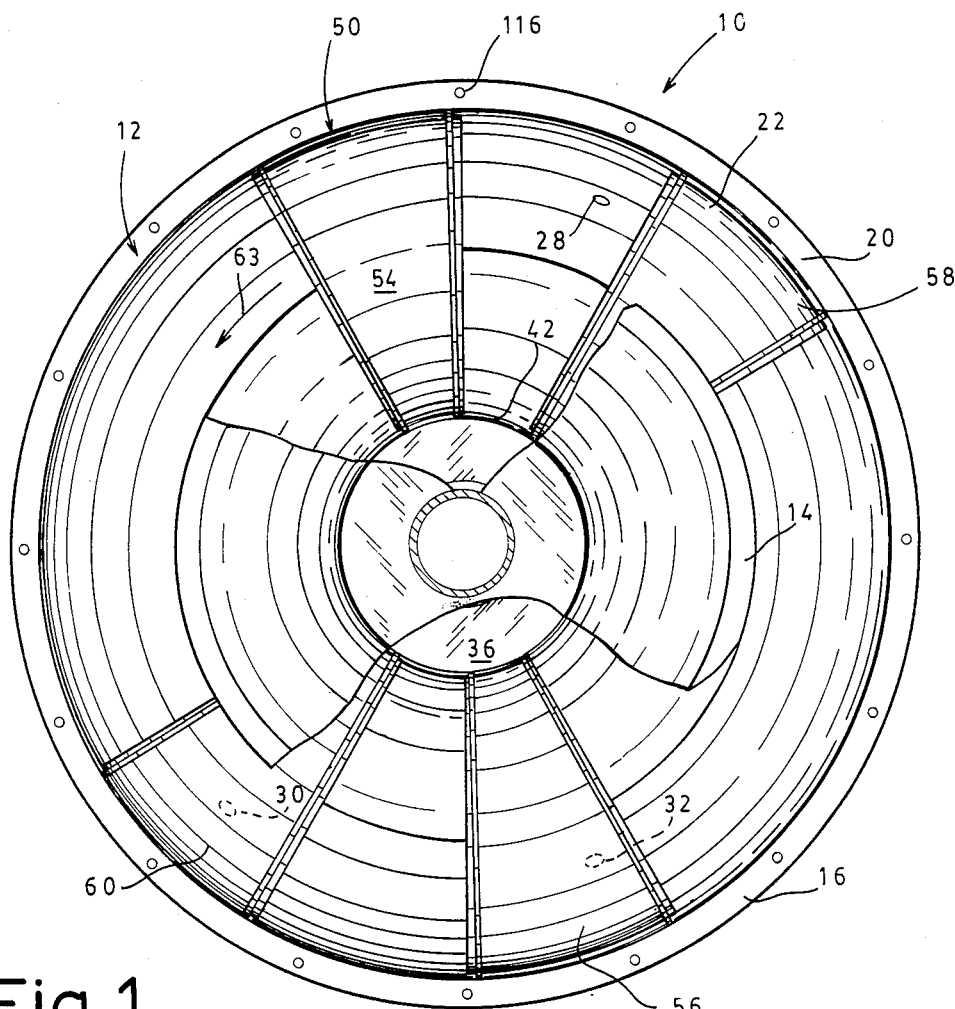
FIG. 1 is an elevation view of a portion of an internal combustion engine constructed in accordance with various features of the present invention, with portions of the wall removed to delineate the pistons mounted within the toroidal cylinder.
Figure 3:
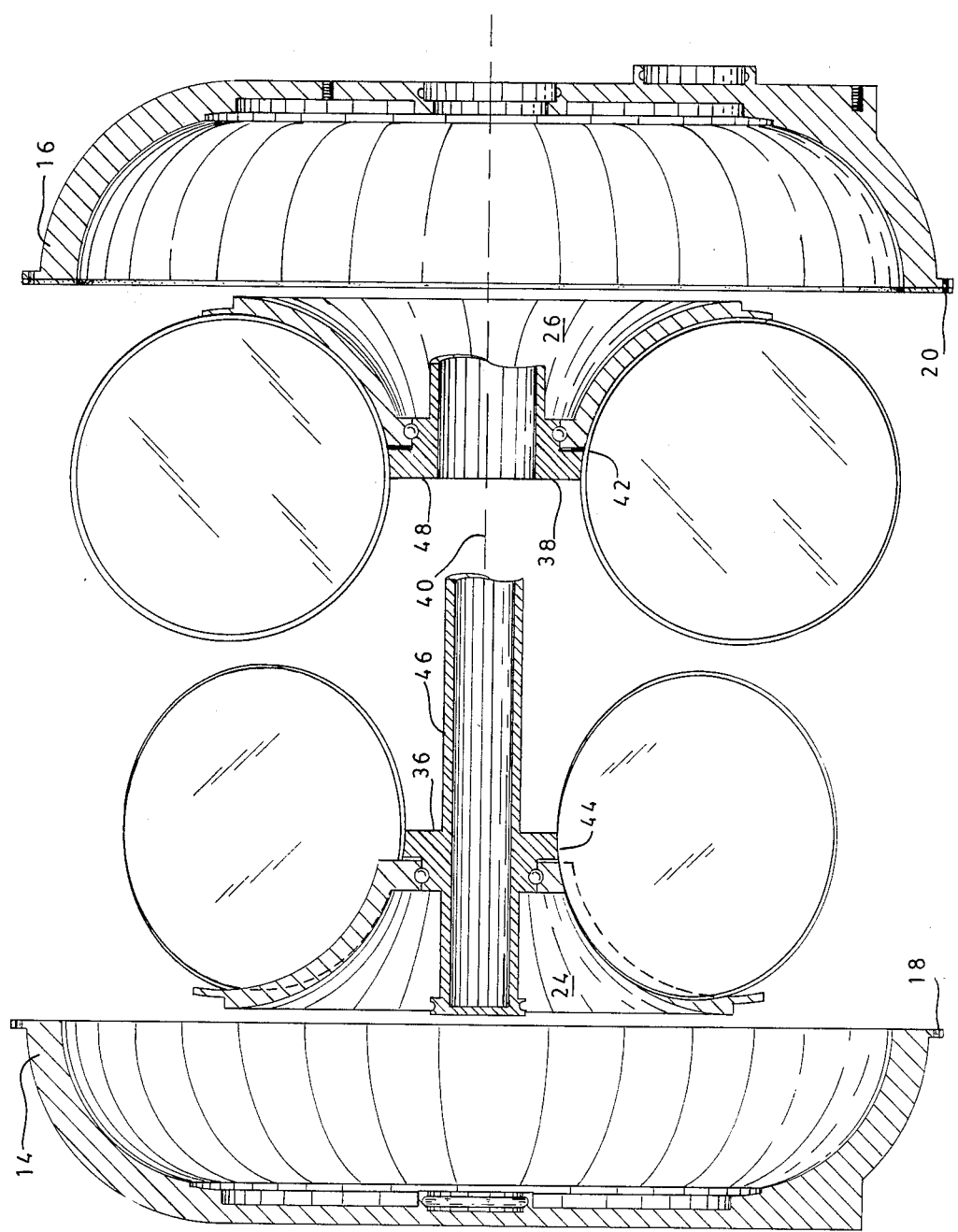
FIG. 3 illustrates a partially exploded view of the wall portion of the engine defining the toroidal cylinder.

Referring now to the figures, an internal combustion engine 10 constructed in accordance with various features of the invention is illustrated in FIG. 1. This internal combustion engine 10 includes wall means generally indicated at 12 which is fabricated from two mating members 14 and 16 illustrated in FIGS. 1 and 3. These wall members 14 and 16, are joined as by being bolted together along their outer perimeter 18 and 20, respectfully, as illustrated in FIGS. 2 and 3. These wall members, when joined, define a toroidal cylinder 22. This cylinder 22 has a substantially circular cross-section which is apparent upon reviewing FIG. 2. The engine, including the wall members, can be fabricated from various materials, including, but not limited to, ceramics, iron, steel, aluminum, etc. Further, the components of the engine are inherently balanced. It will be noted below that the construction of the engine is of relatively simple configuration to reduce the cost of mass production. The engine is also designed to have a greater operating range relative to revolutions per minute and such that the torque developed, particularly at low speeds, should be greater than that of conventional engines.

In the preferred embodiment, the toroidal cylinder 22 is partially constructed with cylinder defining member 24 and cylinder defining member 26 illustrated in FIG. 3. These members 24 and 26 are mounted in juxtaposed relationship and carried within the wall members 14 and 16, respectfully. It will be noted that these cylinder defining members 24 and 26 combine with the wall members 14 and 16 depicted in FIG. 2 to form the toroidal cylinder 22. Thus, FIG. 3 shows these members 26 and 24 in an exploded view and separated prior to construction of the toroidal cylinder depicted in greater detail in FIG. 2.

It will be recognized that the wall means 12 can be fabricated from two mating members which define the toroidal cylinder 22. In this connection, the members 24 and 26 can be integrally formed with the wall means 12.

As necessary, or desired, a suitable gasket such as the gasket 31 depicted in FIG. 2 can be inserted between the perimeters 18 and 20 of the wall members 14 and 16, respectfully, to assist in preventing the escape of lubricant and/or air pressure.

Suitable ports or openings, such as the openings 28, 30 and 32 are provided for selectively injecting fuel into the toroidal cylinder, exhausting spent gases from the toroidal cylinder, and allowing the insertion of air into the cylinder. These ports will be defined in greater detail hereinafter, and are preferably fabricated within the wall means 12 to permit pistons to pass over the ports with minimal resistance.

In the preferred embodiment of the engine, a pair of flywheels 36 and 38 are rotatably mounted along the central axis 40 of the cylinder 22. These plates or flywheels include outer edges such as the outer edge 42 depicted in FIG. 2 of flywheel 36 which form the intermost portion of the toroidal cylinder 22. Similarly, the outer edge 44 of the flywheel 38 is shown in FIG. 2.

Figure 6:
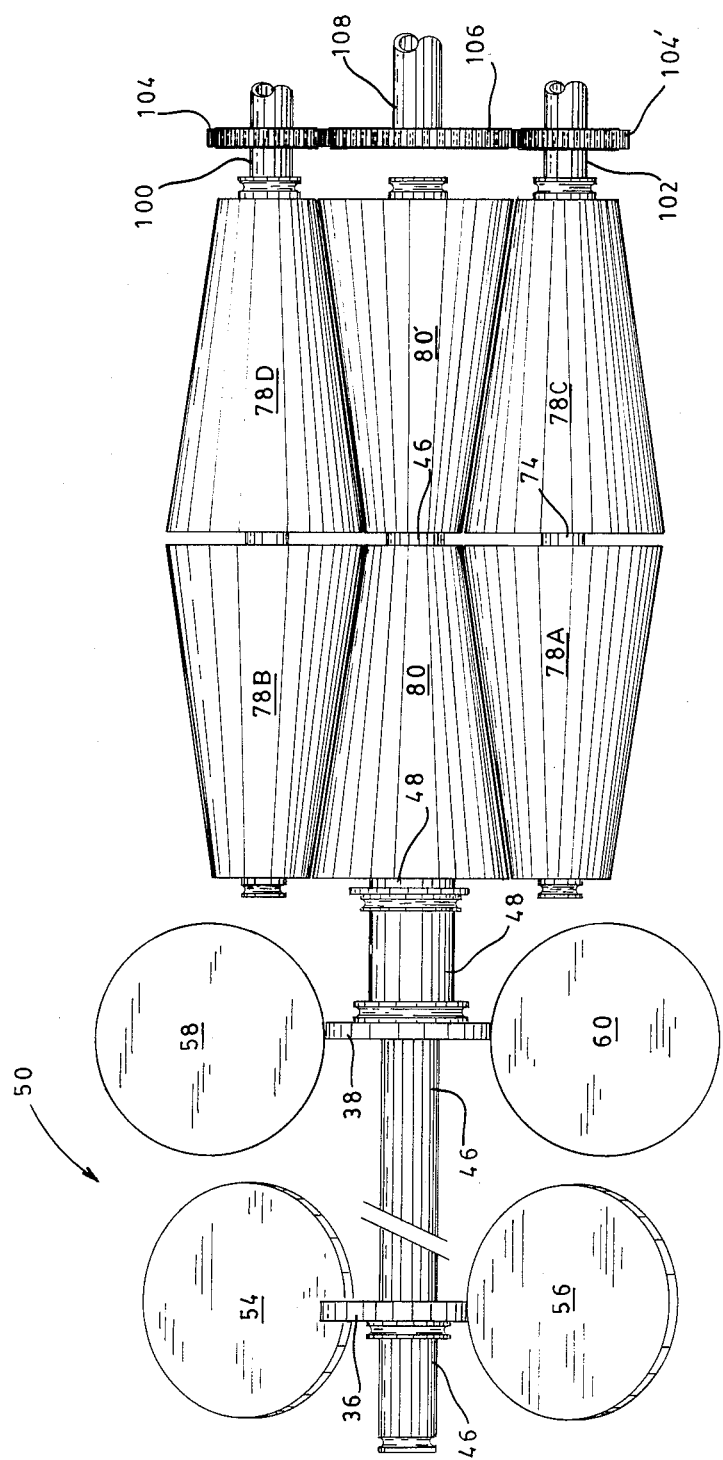
FIG. 6 is a diagrammatic illustration of an engine constructed in accordance with the present invention with the mode control device attached. This illustration depicts the power take off point which rotates with a constant angular velocity. The pistons are removed from their regular orbit of revolution, i.e., the toroidal cylinder, for purposes of illustration.

Each of these two flywheels 36 and 38 are carried by drive shafts. More specifically, flywheel 36 is carried by drive shaft 46, and flywheel 38 is carried by drive shaft 48. It will be noted that these drive shafts are proportioned such that drive shaft 46 is coaxial with and is received within drive shaft 48. In FIG. 6, drive shaft 46 is shown as it is being inserted into drive shaft 48. It will be recognized that this shaft 46 will be pushed into hollow shaft 48 until the piston pairs described in greater detail below align such that they will revolve in the same orbit, i.e., within the toroidal cylinder 22. The flywheels 36 and 38 rotate independently of each other, and in the preferred embodiment, always rotate in the same rotational direction, such as counterclockwise.

Piston means generally indicated at 50 in FIG. 1 are provided. More specifically, the piston means 50 comprises a first pair of pistons 54 and 56, which are mounted on the perimeter 42 of the flywheel 36. It will be noted that pistons 54 and 56 are mounted on opposite sides, or more specifically, 180 degrees apart on the flywheel 36. In this connection, the flywheel with the operatively associated pistons remains balanced. Similarly, pistons 58 and 60 are mounted on opposite sides, or 180 degrees apart, on flywheel 38 as illustrated in FIG. 1, and diagrammatically depicted in FIG. 6.

Figure 5:
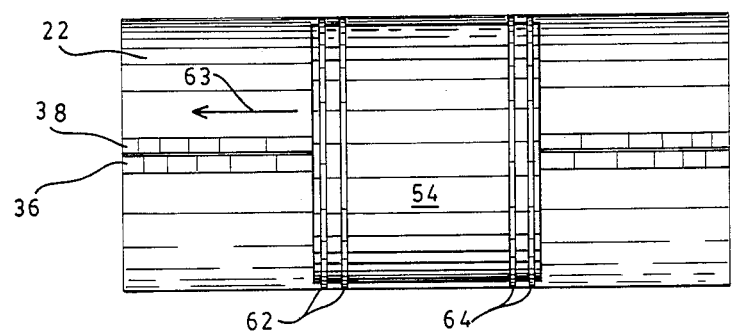
FIG. 5 represents a stretched out view of a piston mounted within the cylinder on its operatively associated flywheel.

Each of the illustrated pistons 54, 56, 58, and 60 are slidably received within the toroidal cylinder 22 as depicted in FIG. 1. A typical piston 54, which is representative of each of the other pistons 56, 58, and 60 is depicted in FIG. 5. (Also see FIG. 1.) This piston 54 is substantially wedge shaped as shown in FIG. 1 when viewed in a side elevation illustration. Its cross-sectional outline, however, is proportioned for being received within the toroidal cylinder 22 such that the piston rings 62 along or proximate the leading face of the piston as it revolves in the direction of arrow 63, and the piston ring 64 proximate the trailing face of the piston serve to form an air tight or hermetic seal or barrier with the operatively associated wall of the cylinder 22. This cylinder 22 is shown in a partially stretched out view in FIG. 5 for purposes of clarity. It will be noted that each of the pistons are similarly shaped and provided with similar rings to establish hermetic seals between the compressing/expanding chambers of the engine during regular engine operation. For example, the rings permit compression between juxtaposed faces of cooperating pistons. Further, it should be noted that compression is achieved in the chambers defined between adjacent pistons, as depicted in FIG. 1, by movement of one of the pistons on flywheel 36 towards a piston mounted on flywheel 38. This is achieved, as will be described in greater detail hereinafter, by rotation of the flywheels which carry the revolving pistons at different angular velocities such that the cooperating pistons approach and retreat one from the other due to the varying speed of rotation of the flywheel upon which such pistons are mounted.

Figure 4:
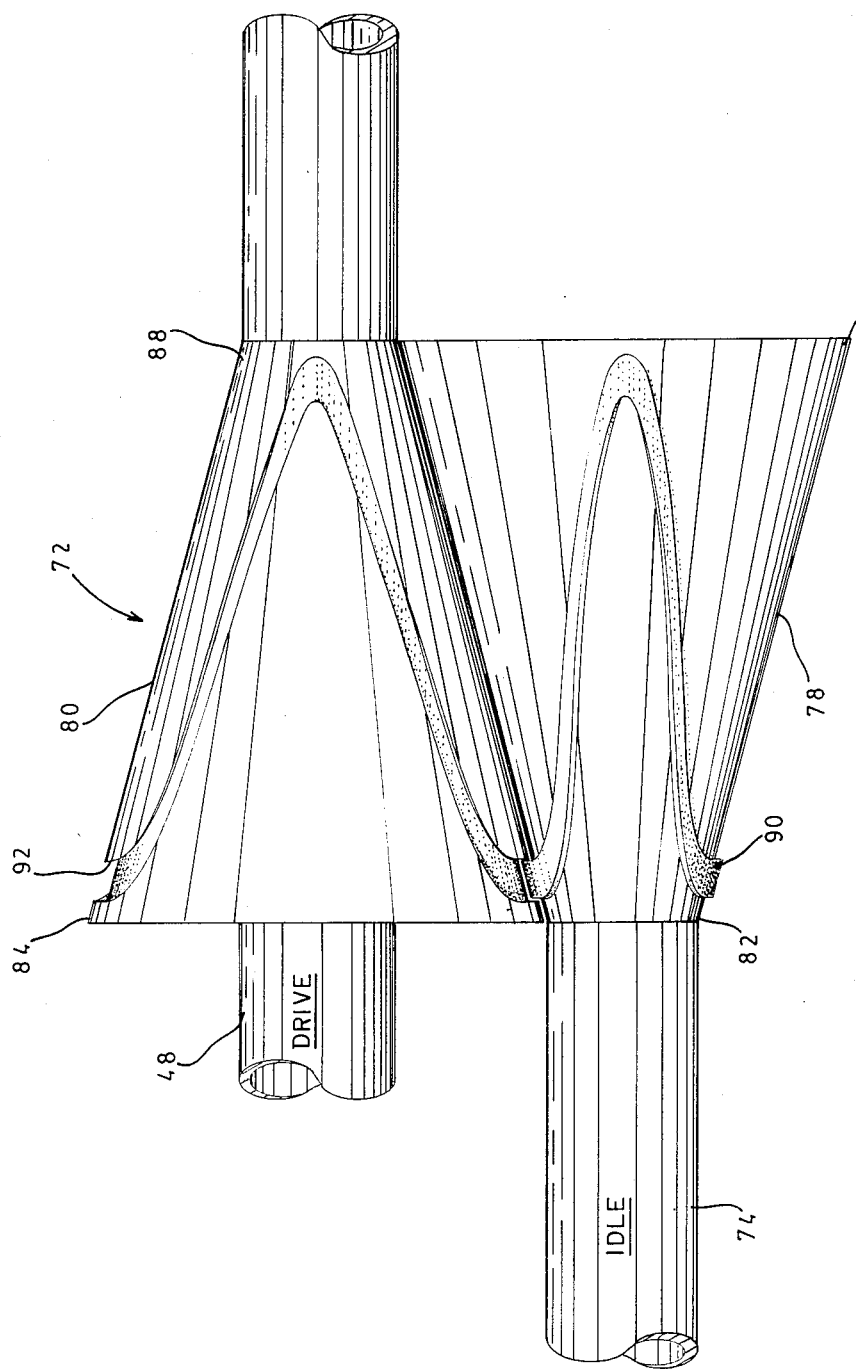
FIG. 4 represents an elevation view of a suitable coupling device used in connection with controlling the mode of operation of the pistons.

Means generally indicated at 70 in FIGS. 2 and 6 serve to control the mode of operation of the piston means 50. More specifically, the mode control means or device 70 controls the angular velocity with which the flywheels and pistons carried thereby revolve for defining the compression and expansion chambers during an engine cycle. In the depicted embodiment, the mode control means 70 includes a coupling device 72 illustrated in FIG. 4. This coupling device is designed such that the shaft 74 and the shaft 48 (see FIG. 4) will rotate at different angular velocities during an engine cycle for purposes which will be more clearly described herein below. To this end, shaft 74 carries coupling member 78 which is mechanically connected to coupling member 80 mounted on drive shaft 48. The coupling member 78 is substantially conical in configuration and defines a substantially circular cross-sectional outline. The smaller end portion 82 of the coupling member 78 is operatively associated with the larger end portion 84 of the coupling member 80 as illustrated. Similarly, the larger end portion 86 of the coupling member 78 is operatively associated with the smaller end portion 88 of the coupling member 80. Coupling member 78 carries a raised substantially sinusoidal connecting member 90 which is received within a similarily shaped but recessed groove 92 defined in the connecting member 90. Thus, upon rotation of the shaft 74, rotational forces are imparted to the shaft 48 through the coupling device 72. It will be noted, however, that the rotational speed of the shaft 48 will sometimes be greater, equal to and less than, the speed of rotation of the shaft 74. For example, when the connecting member 90 at the smaller end portion 82 of the member 78 is received within the groove 92 at the larger end portion 84 of the member 80, shaft 48 will rotate at a lesser speed than the shaft 74. When the mechanical connection between the coupling members 78 and 80 is accomplished proximate the larger end portion 86 of coupling member 78, shaft 48 will rotate at a greater speed than the rotation of the shaft 74.

The mode control means 70 which includes the drive coupling members 80 and 80', and the driven coupling members 78A–D, will now be described in greater detail. This mode control means 70 serves to control or synchronize the speed of revolution or angular velocity of the pistons during an engine cycle which will be described herein below. More specifically, as shown in FIGS. 2 and 6, the driven coupling members 80 and 80' are mounted on the drive shafts 48 and 46, respectfully. Thus, during the engine cycle as pistons 54 and 56 revolve, imparting rotational forces to shaft 46, driven coupling member 80' is rotated. Similarily, as pistons 58 and 60 revolve, causing shaft 48 to rotate, driven coupling member 80, mounted on shaft 48, will likewise rotate. As coupling member 80 rotates, rotational forces are imparted to the driven coupling members 78A and 78B which are mechanically connected to the driven coupling member 80 as described in connection with FIG. 4. Similarily, as coupling member 80' is driven, rotational forces are imparted in the driven coupling members 78C and 78D mechanically connected thereto. It will be noted in FIG. 6 and in FIG. 2 that coupling members 78B and 78D are mounted on shaft 100, and coupling members 78A and 78C are mounted on shaft 102. Each of these shafts carries a gear 104,104'. These gears 104,104' are mechanically connected one to the other as illustrated in FIGS. 2 and 6 through gear 106 carried by shaft 108. This shaft 108 serves as a preferred power take-off point and will rotate at a constant speed. The shafts 100 and 102 can also serve as power take-off points or outputs.

It will be noted in FIG. 2 that shafts 100 and 102 are journalled in the mode control means housing 110. By mounting the coupling members as illustrated in FIGS. 2 and 6, the mode of operation including the angular velocity of the pistons cooperating to define the compression and expansion chambers during the engine cycle is controlled or synchronized. A complete cycle of the engine will now be described to more clearly illustrate this point.

Assume that the original orientation of the pistons to be that depicted in FIG. 1, and the 0 degree position to be indicated at 116 in FIG. 1 with the degrees increasing in a counterclockwise direction, i.e., in the direction of the arrow 63, until the complete revolution is completed and the piston 54 has returned to its original orientation. The ratio of the coupling device 72 and its respective coupling members is designed such that pistons 54 and 56 can revolve from their beginning positions counterclockwise 162 degrees, while pistons 58 and 60 mounted on flywheel or plate 38 rotate 18 degrees. At the beginning of the cycle, fuel is injected into the chamber defined between pistons 54 and 58. A conventional fuel injector 59 operates through port 28 to introduce the fuel into the compression chamber. The fuel is then ignited by a conventional ignition means shown diagrammatically at 63 in FIG. 2. The injector and the ignition means can assume various forms. For example, it is within the scope of the invention to use a laser or other high energy light or radio frequency (RF) energy for ignition purposes which would fire through a window of glass or other translucent material, which would cover port 28.

The fuel air mixture is then ignited which drives piston 54 from the position illustrated in FIG. 1 approximately 162 degrees in the direction of arrow 63. During this motion, piston 54 passes the exhaust port 30 which forces spent gases from the previous power stroke from the cylinder. This exhaust port 30 is located at approximately 120 degrees on the reference system discussed above in connection with FIG. 1. At the same time as piston 54 is being forced generally downward in FIG. 1, piston 56 travels from the 180 degrees location to 342 degrees, and compresses air which enters through the intake port 32 between pistons 56 and 58. It will be noted that the intake port is located at approximately 210 degrees. The mode control means limits the travel of piston 58 to movement from approximately 342 degrees to 360 degrees or 0. Since each piston takes up approximately 12 degrees, the trailing face of piston 58 is separated from the leading face of piston 56 by approximately 6 degrees at their nearest location. At this point, the timed injector is actuated again, and the process is repeated. Thus, during each power stroke full functions of a conventional four cylinder engine are performed. That is a portion of the chamber containing the exhaust fumes is cleared as has been described in connection with piston 54. As those fumes are in front of piston 54, the combustion occurs behind piston 54 and ahead of piston 58. Simultaneously, piston 56 compresses air in the right side of the chamber illustrated in FIG. 1, and at the same time pulls in air behind it from the intake port creating a vacuum or, in an alternate design, by allowing compressed air to enter from a turbo charger, or other suitable means. The air, illustrated diagrammatically at 61 (see FIG. 2), is sucked into the chamber between the pistons through port 32.

A starter mechanism of conventional design will be attached to the power train as described in connection with FIGS. 2 and 6, and can be mechanically connected through drive shaft 108. The gear or rotational ratio established by the coupling members together with the size of the pistons can be altered to achieve varying compression ratios. Also, the port locations can be changed to achieve the same purpose. It is also possible to have more than one port for intake or exhaust in order that an operator can select which port will be used and which will be shut off by a simple flap or other suitable valve in order to change compression ratios while the engine is in operation. Ignition means can be provided, and may take the form of a spark plug in a spark type engine, and could be located in the area of the fuel injector, that is proximate port 28. Timing of the injector, as well as that of the spark plug, can be controlled mechanically or by computer in the same fashion as are engines of modern day designs. Depending on the application, one or more fuel injectors may be installed from 210 to 348 degrees and one or more ignition sources can be utilized for timing purposes from 336 to 348 degrees. In addition to the normal spark type ignition, ignition can also be achieved by a device using high energy light or radio frequency energy directed through a window in wall means 12, which window would encompass an area 336 to 348 degrees, which window would be an integral part of the wall means but constructed of material which would permit the passage of light or high frequency radio energy into the chamber. The pulses of light or radio frequency energy would be controlled for timing purposes in the same manner as a spark plug.

A cooling system can be provided by simply placing a water jacket around the combustion chamber or by casting passageways for coolant in the walls of the combustion chamber itself, or in air cooled engines by attaching heat sinks to wall means 12.

It is also possible to use the engine as a compressor or pump, and in such case, the only change required would be the removal of the spark plug and injector, and an alteration in the placement of the intake and exhaust ports. More specifically, the intake ports could be placed at 30 degrees and 210 degrees, and the exhaust port placed at 150 degrees and 330 degrees, using the reference established above, to prevent the pumped material from flowing back into the chamber.

Having discussed the cycle of the engine and the mode control means, it will now be understood that power is achieved by use of the mode control means 70 which allows one plate or flywheel to turn at substantially faster speeds than the other flywheels. At the point at which the pistons almost touch, the mode control means through the use of the coupling members described herein above shifts the rotational speed ratio of the shafts so as to slow the rear piston and to allow the forward piston to surge ahead at substantially faster speeds (approximately 2 to 25 times the speed of the other plate) until the faster pistons nearly touch the pistons ahead of them at which time they are slowed and the cycle repeats itself. The compression/expansion chambers are thus defined during this process. It will also be noted that the compression ratio can be chosen such that the engine can run on deisel fuel.

Suitable seals will be provided between the flywheels and between each flywheel and the wall means. These seals will serve to prevent gases from escaping during engine operation. Further, the engine of the present invention is designed to have few moving parts which will reduce its construction and maintenance costs. It is also inherently smaller in size and lighter in weight with respect to a comparable conventional engine with similar displacement.

While a preferred embodiment of the invention has been described and illustrated, there are modifications and alternate embodiments that can be constructed without departing from the spirit and scope of the invention described in the attached claims and equivalence thereof.

What is claimed:

1. An internal combustion engine comprising:
   wall means defining at least one toroidal cylinder;
   at least one pair of flywheels mounted for rotation with respect to said cylinder around a central axis thereof and with respect to each other;
   piston means within said cylinder including a first pair of pistons mounted on one of said flywheels at selected locations, and a further pair of pistons mounted on another of said flywheels at selected locations, said pistons cooperating to define with said cylinder compressing/expanding chambers during rotation of said flywheels and said pistons attached thereto;
   means for injecting fuel and inserting air into said compressing chamber through said wall means of said cylinder;
   means for igniting fuel injected within said cylinder at predetermined times such that said ignited fuel acts against said piston means and causes said piston means to revolve within said cylinder; and
   means for controlling the mode of operation of said piston means and said flywheels whereby said first and further pairs of pistons revolve in the same direction within said cylinder at varying angular velocities during cycles of said engine, said means for controlling said mode including
   a. a first rotating shaft carrying said one of said flywheels,
   b. a second rotating shaft carrying said another of said flywheels,
   c. at least one first gear member carried on said first rotating shaft, said first gear member defining a substantially conically configured surface with a first end of a first selected diameter and a second end of a second selected larger diameter, said surface provided with first gear engagement means of a selected configuration,
   d. at least one second gear member disposed proximate said first gear member having a conically configured surface with a first end of one selected diameter proximate said second end of said first gear member and a second end of a selected larger diameter proximate said first end of said first gear member, said surface of said second gear member provided with further gear engagement means of a selected configuration operatively associated with said gear engagement means on said surface of said first gear means whereby said second gear means is rotatable in a direction opposite said first gear means, said configuration of said first and further gear engagement means of said first and said second gear members selected whereby intermeshing between said first and said second gear members reciprocates between ends of said gear members whereby said second gear member is rotated at said varying angular velocities with respect to said first rotating shaft, and
   e. gear coupling means connected between said second gear means and said second rotating shaft to rotate said second rotating shaft at said varying angular velocities with respect to said first rotating shaft to thereby cause said pistons to define said compressing/expanding chambers within said cylinder during an engine cycle.

2. The engine of claim 1 wherein said wall means is fabricated from two mating wall members joined along their perimeter to define said toroidal cylinder.

3. The engine of claim 2 wherein said wall members carry juxtaposed cylinder defining members which combine with said wall members to form said toroidal cylinder upon joining said wall members.

4. The engine of claim 2 including gasket means interposed between said joined wall members to assist in forming a hermetic seal therebetween.

5. The engine of claim 1 including port means defined in said wall means, said port means including a plurality of ports spaced at selected locations, at least one of said ports serving as an opening through which air is inserted into said cylinder, at least one of said ports being operatively associated with said means for injecting said fuel into said cylinder, and at least one of said ports serving as an opening through which spent gases are exhausted from said cylinder.

6. The engine of claim 1 wherein said flywheels are rotatably mounted between said wall members such that outer edges of said flywheels form an intermost portion of said toroidal cylinder within which said pistons revolve.

7. The combustion engine of claim 1 wherein said gear engagement means on said conically configured surface of said first gear member is a substantially sinusoidal ridge extending proximate said first end to proximate said second end, and wherein said engagement means on said conically configured surface of said second gear member is a substantially sinusoidal groove extending proximate said first end to proximate said second end to receive said ridge whereby said first and second gear members are coupled for rotation at said varying angular velocities of said gear members.

8. The combustion engine of claim 1 wherein said gear coupling means connected between said second gear member and said second rotating shaft comprises:
   an idler shaft attached to and rotatable with said second gear member;

a third gear member mounted upon said idler shaft and rotatable therewith, said third gear member defining a substantially conically configured surface with a first end of a first selected diameter and a second end of a second selected larger diameter, said surface provided with gear engagement means of a selected configuration;

a fourth gear member mounted upon said second rotating shaft and disposed proximate said third gear member, said fourth gear member defining a substantially conically configured surface with a first end of one selected diameter proximate said second end of said third gear member and a second end of a selected larger diameter proximate said first end of said third gear member, said surface of said fourth gear member provided with gear engagement of a selected configuration means operatively associated with said gear engagement means on said surface of said third gear member whereby said fourth gear member is rotatable in a direction opposite said third gear member and said second rotating shaft is rotated in the same direction as said first rotating shaft at said varying angular velocities relative to said first rotating shaft.

9. An internal combustion engine comprising:
wall means defining at least one toroidal cylinder, said wall means being fabricated from two mating members joined along their perimeter to define said toroidal cylinder;

at least one pair of flywheels mounted for rotation with respect to said cylinder around a central axis thereof and with respect to each other, one flywheel being carried by a first rotating shaft, and a further flywheel being carried by a further hollow rotating shaft wherein said first shaft is rotatably received within said further hollow shaft, such that said flywheels can rotate independently of each other, and in the same direction with varying angular velocities;

piston means including a first pair of pistons mounted on said one flywheel at selected locations, and a further pair of pistons mounted on said further flywheel at selected locations, said pistons cooperating to define with said cylinder compressing/expanding chambers during rotation of said flywheels and said pistons attached thereto at said varying angular velocities;

means for injecting fuel and inserting air into said compressing chamber through said wall means of said cylinder;

means for controlling the mode of operation of said piston means and said flywheels whereby said first and further pairs of pistons revolve in the same direction within said cylinder at said varying angular velocities during cycles of said engine, said means for controlling said mode of operation including a. at least one first gear member carried on said first rotating shaft, said first gear member defining a conically configured surface with a first end of a first selected diameter and a second end of a second selected larger diameter, said surface provided with gear engagement means of a selected configuration, and b. at least one second gear member, disposed proximate said first gear member, having a conically configured surface with a first end of one selected diameter proximate said second end of said first gear member and a second end of a selected larger diameter proximate said first end of said first gear member, said surface of said second gear member provided with gear engagement means of a selected configuration operatively associated with said gear engagement means on said surface of said first gear member whereby said second gear member is rotatable in a direction opposite said first gear member, said configuration of said gear engagement means of said first and said second gear members selected whereby intermeshing between said first and said second gear members reciprocates between ends of said gear members whereby said second gear member is rotated at said varying angular velocities with respect to said first rotating shaft, and c. gear coupling means connected between said second gear member and said second rotating shaft to rotate said second rotating shaft at said varying angular velocities with respect to said first rotating shaft to thereby define said compressing/expanding chambers by said piston means within said cylinder during an engine cycle; and means for igniting fuel injected within said cylinder at predetermined times such that said ignited fuel acts against said piston means and causes said piston means to revolve within said cylinder.

10. The engine of claim 9 wherein said wall members carry juxtaposed cylinder defining members which combine with the wall members to form said toroidal cylinder upon joining said wall members.

11. The engine of claim 9 including gasket means interposed between said joined wall members to assist in forming a hermetic seal therebetween.

12. The engine of claim 9 including port means defined in said wall means, said port means including a plurality of ports spaced at selected locations, at least one of said ports serving as an opening through which air is inserted into said cylinder, at least one of said ports being operatively associated with said means for injecting said fuel into said cylinder, and at least one of said ports serving as an opening through which spent gases are exhausted from said cylinder.

13. The engine of claim 9 wherein said flywheels are rotatably mounted between said wall members such that outer edges of said flywheels form an intermost portion of said toroidal cylinder through which said pistons revolve.

14. The combustion engine of claim 9 wherein said gear engagement means on said conically configured surface of said first gear member is a substantially sinusoidal ridge extending proximate said first end to proximate said second end, and wherein said engagement means on said conically configured surface of said second gear member is a substantially sinusoidal groove extending proximate said first end to proximate said second end to receive said ridge whereby said first and second gear members are coupled for rotation at said varying angular velocities of said gear members.

15. The combustion engine of claim 9 wherein said gear coupling means connected between said second gear member and said second rotating shaft comprises:
an idler shaft attached to and rotatable with said second gear member;
a third gear member mounted upon said idler shaft and rotatable therewith, said third gear member defining a substantially conically configured surface with a first end of a first selected diameter and a second end of a second selected larger diameter, said surface provided with gear engagement means of a selected configuration;

a fourth gear member mounted upon said second rotating shaft and disposed proximate said third gear member, said fourth gear member defining a substantially conically configured surface with a first end of one selected diameter proximate said second end of said third gear member and a second end of a selected larger diameter proximate said first end of said third gear member, said surface of said fourth gear member provided with gear engagement means of a selected configuration operatively associated with said gear engagement means on said surface of said third gear member whereby said fourth gear member is rotatable in a direction opposite said third gear member and said second rotating shaft is rotated in the same direction as said first rotating shaft at said varying angular velocities relative to said first rotating shaft.

16. An internal combustion engine comprising:

wall means defining at least one toroidal cylinder, said wall means being fabricated from two mating members joined along their perimeter to define said toroidal cylinder;

at least one pair of flywheels mounted for rotation with respect to said cylinder around a central axis thereof and with respect to each other, one flywheel being carried by a first rotating shaft, and a further flywheel being carried by a further hollow rotating shaft wherein said first shaft is rotatably received within said further hollow shaft, such that said flywheels can rotate independently of each other, and in the same direction with varying angular velocities;

piston within said cylinder including a first pair of pistons mounted on said one of said flywheels at selected locations, and a further pair of pistons mounted on said further flywheel at selected locations, said pistons cooperating to define with said cylinder compressing/expanding chambers during rotation of said flywheels and said pistons attached thereto at said varying angular velocities;

means for injecting fuel and inserting air into said compressing chamber through said wall means of said cylinder;

means for controlling the mode of operation of said piston means and said flywheels whereby said first and further pairs of pistons revolve in the same direction within said cylinder at said varying speeds of revolution during cycles of said engine, said means for controlling said mode of operation including a. at least one first gear member carried on said first rotating shaft, said first gear member defining a substantially conically configured surface with a first end of a first selected diameter and a second end of a second selected larger diameter, said surface provided with a substantially sinusoidal ridge extending proximate said first end to proximate said second end of said first gear member, b. at least one second gear member, disposed proximate said first gear member, having a substantially conically configured surface with a first end of one selected diameter proximate said larger selected diameter of said first gear member and a second end of a selected larger diameter proximate said first end of said first gear member, said surface of said second gear member provided with a substantially sinusoidal groove extending proximate said first end to proximate said second end of said second gear member to receive said ridge whereby said first and second gear members are coupled for rotation and said second gear member is rotatable in a direction opposite said first gear member at said varying angular velocities relating to said first gear member, and c. gear coupling means connected between said second gear member and said second rotatable shaft whereby said second rotatable shaft is rotatable at said varying angular velocities with respect to said first rotating shaft to thereby define said compressing/expanding chamber within said cylinder during an engine cycle; and means for igniting fuel injected within said cylinder at predetermined times such that said ignited fuel acts against said piston means and causes said piston means to revolve within said cylinder.

17. The combustion engine of claim 16 wherein said gear coupling means connected between said second gear member and said second rotating shaft comprises:

an idler shaft attached to and rotatable with said second gear member;

a third gear member mounted upon said idler shaft and rotatable therewith, said third gear member defining a substantially conically configured surface with a first end of a first selected diameter and a second end of a second selected larger diameter, said surface provided with gear engagement means;

a fourth gear member mounted upon said second rotating shaft and disposed proximate said third gear member, said fourth gear member defining a substantially conically configured surface with a first end of one selected diameter proximate said second end of said third gear member and a second end of a selected larger diameter proximate said first end of said third gear member, said surface of said fourth gear member provided with gear engagement means operatively associated with said gear engagement means on said surface of said third gear member whereby said fourth gear member is rotatable in a direction opposite said third gear member and said second rotating shaft is rotated in the same direction as said first rotating shaft at said varying angular velocities relative to said first rotating shaft.

* * * * *

65